(12) United States Patent
Zhang

(10) Patent No.: US 11,072,205 B2
(45) Date of Patent: Jul. 27, 2021

(54) STRAIGHT STEEL MONOFILAMENT FOR A BELT PLY

(71) Applicant: NV BEKAERT SA, Zwevegem (BE)

(72) Inventor: Aijun Zhang, Jiangyin (CN)

(73) Assignee: NV BEKAERT SA, Zwevegem (BE)

(*) Notice: Subject to any disclaimer, the term of this patent is extended or adjusted under 35 U.S.C. 154(b) by 388 days.

(21) Appl. No.: 15/950,483

(22) Filed: Apr. 11, 2018

(65) Prior Publication Data

US 2018/0297408 A1  Oct. 18, 2018

Related U.S. Application Data

(62) Division of application No. 14/901,952, filed as application No. PCT/EP2014/059757 on May 13, 2014, now abandoned.

(30) Foreign Application Priority Data

Jul. 29, 2013  (CN) .......................... 201310321016.8

(51) Int. Cl.
*B21F 7/00* (2006.01)
*B60C 9/00* (2006.01)
(Continued)

(52) U.S. Cl.
CPC ............ *B60C 9/0007* (2013.01); *B21F 1/023* (2013.01); *B21F 7/00* (2013.01); *B60C 9/0064* (2013.01);
(Continued)

(58) Field of Classification Search
CPC .......... B60C 9/0007; B60C 2009/0014; B60C 2009/0092; B60C 9/0064; B21F 1/02;
(Continued)

(56) References Cited

U.S. PATENT DOCUMENTS 2,289,398 A * 7/1942 Whist ....................... B21F 7/00
72/64
3,402,546 A * 9/1968 Peene .................. D07B 1/0613
57/236
(Continued)

FOREIGN PATENT DOCUMENTS

DE   11 2011 102189 T5   4/2013
GB         2098251 A     11/1982
(Continued)

OTHER PUBLICATIONS

Translation, JP 09-217286A, Aug. 1997.*
(Continued)

*Primary Examiner* — Edward T Tolan
(74) *Attorney, Agent, or Firm* — Bacon & Thomas, PLLC

(57) ABSTRACT

A method for manufacturing a straight steel monofilament for the reinforcement of belt ply of a pneumatic tyre, where the arc-height of the straight steel monofilament is less than 30 mm. The steel monofilament is plastically deformed by a twisting along the axis of the steel monofilament on a double-twist apparatus. The plastic twist deformation eliminates the surface stress difference on the steel monofilament and provides a strainght steel monofilament for belt ply reinforcement. This provides a simple solution with existing apparatus to manufacture straight steel monofilament suitable for tire reinforcement with high speed for mass production.

10 Claims, 6 Drawing Sheets

(51) Int. Cl.
*B21F 1/02* (2006.01)
*D07B 1/06* (2006.01)
*B60C 9/18* (2006.01)
B60C 9/20 (2006.01)

(52) U.S. Cl.
CPC .......... *B60C 9/1821* (2013.01); *D07B 1/0606* (2013.01); *B60C 2009/0014* (2013.01); *B60C 2009/2074* (2013.01); *B60C 2009/2096* (2013.01); *D07B 2207/203* (2013.01); *D07B 2207/205* (2013.01); *D07B 2207/4072* (2013.01); *D07B 2401/406* (2013.01); *D07B 2501/2046* (2013.01)

(58) Field of Classification Search
CPC .... B21F 1/04; B21F 7/00; B21F 9/007; B21F 1/023; D07B 1/062; D07B 1/064
See application file for complete search history.

(56) References Cited

U.S. PATENT DOCUMENTS

| | | | | |
|---|---|---|---|---|
| 3,847,002 A | * | 11/1974 | Suzuki | B21F 9/00 72/128 |
| 4,195,469 A | * | 4/1980 | Tarantola | D07B 5/12 57/311 |
| 4,335,571 A | * | 6/1982 | Tarantola | D07B 3/106 57/58.52 |
| 4,495,759 A | * | 1/1985 | Brandyberry | D07B 3/02 57/58.52 |
| 4,650,531 A | * | 3/1987 | Brandyberry | B29C 70/20 156/166 |
| 4,819,705 A | | 4/1989 | Caretta | |
| 5,743,078 A | * | 4/1998 | Doornaert | D07B 1/062 57/212 |
| 5,858,137 A | | 1/1999 | Assaad et al. | |
| 5,911,675 A | * | 6/1999 | Obana | D07B 1/064 152/451 |
| 6,273,161 B1 | | 8/2001 | Yamagami et al. | |
| 6,412,263 B1 | * | 7/2002 | Lee | D07B 1/0613 57/204 |
| 8,359,823 B2 | * | 1/2013 | Qi | D07B 1/0646 57/212 |
| 8,720,175 B2 | * | 5/2014 | Rodriguez | D07B 7/025 57/212 |
| 9,610,641 B2 | * | 4/2017 | Vaubourg | B23D 61/18 |
| 2010/0261032 A1 | | 10/2010 | Lee | |
| 2013/0206302 A1 | | 8/2013 | Yasuda et al. | |

FOREIGN PATENT DOCUMENTS

| | | | | |
|---|---|---|---|---|
| JP | S58-215232 A | | 12/1983 | |
| JP | H03-151118 A | | 6/1991 | |
| JP | 04-308287 A | * | 10/1992 | ............... B60C 9/00 |
| JP | 09-217286 A | * | 8/1997 | ............... B60C 9/00 |
| JP | 2005-169484 A | | 6/2005 | |
| JP | 2013-132688 A | | 7/2013 | |
| KR | 20-2008-0002263 U | | 7/2008 | |
| WO | 03/076321 A1 | | 9/2003 | |
| WO | 2012002111 | | 1/2012 | |

OTHER PUBLICATIONS

Translation; JP04-308287, Oct. 1992.*
International Search Report (ISR) dated Apr. 28, 2015, for PCT/EP2014/059757.

* cited by examiner

STRAIGHT STEEL MONOFILAMENT FOR A BELT PLY

The invention relates to a monofilament for pneumatic tire, and in particular a monofilament for the belt ply reinforcement of the pneumatic tire. This invention also relates to a process to manufacture the monofilament for pneumatic tire.

BACKGROUND ART

A pneumatic tire generally comprises: a carcass structure comprising at least one carcass ply, a tread band in a position radially external to the carcass structure, a belt structure interposed between the carcass structure and the tread band.

Prior art U.S. Pat. No. 4,819,705A discloses a pneumatic tire for motor vehicles with a low absorption of horse-power. The tire has an annular belt structure which comprises two layers of rubberized fabric with metallic cords having a diameter of not more than 0.603 mm embedded therein. The radial reciprocal distance between the centres of two facing cords in the radial direction on the cross-section of the tire is not over 1 mm. The metallic cords may be three, four or even five elementary filaments twisted together into a strand, with each filament having a diameter of 0.12 to 0.25 mm. As an alternative to the metallic cords, single untwisted steel monofilaments having diameter within the above indicated range may be used.

Prior art U.S. Pat. No. 5,858,137A further discloses a pneumatic tire which not only maintains excellent handling characteristics but does so without the unacceptable filament breakage in the belt plies. The pneumatic tire has at least two belt plies each of which comprises a layer of substantially straight steel monofilaments inclined at an angle of 10 to 30 degree with respect to the equatorial plane of the tire. The steel monofilaments are laid at an end count ranging from 25 to 60 ends per inch and each monofilament has a diameter from 0.25 to 0.40 mm, a tensile strength of at least 4080 MPa−2000×D×95%, where D is the filament diameter in millimetres, and a fatigue resistance of at least 3500 cycles as measured by the three-roll bending fatigue test.

The manufacturing process for a monofilament suitable for above applications comprises firstly drawing a steel rod to the desired filament diameter, and then straightening the filament with a roller straightener as disclosed in JP3151118A or KR20080002263U. But this manufacturing process has drawbacks, because of the residual bending stress in the filament from the drawing process. Firstly, the roller straightener has inherent limitations to provide a perfectly straight monofilament because the roller straightener can not release all the bending stress in the filament. Secondly, the fine tuning of the roller straightener is time-consuming and costly because of the variation of bending stress in the filament. Thirdly, the result of the straightening process can not be maintained because of the variation of bending stresses in the filaments in mass production. For example, some portions of the monofilament are straight while other portions are out of range.

Although the above prior art provides pneumatic tires comprising monofilament reinforced belt plies, there is still room for improvement as to homogeneity and consistency of the straightness of the monofilaments.

SUMMARY OF THE INVENTION

It is an object of the present invention to overcome the drawbacks of the prior art.

It is also an object of the present invention to provide a straight steel monofilament suitable for belt ply reinforcement in a pneumatic tire.

It is yet another object of the present invention to obtain a steel monofilament with improved consistency with respect to the straightness.

It is still another object of the present invention to obtain a steel monofilament where the straightness has a reduced standard variation in mass production.

It is a further object of the present invention to provide a simple process to manufacture a straight steel monofilament suitable for belt ply reinforcement in a pneumatic tire.

According to one aspect of present invention, a straight steel monofilament for belt ply reinforcement in a pneumatic tire has the property that the arc-height of the straight steel monofilament is less than 30 mm, and preferably less than 20 mm. In the context of the present invention, the term "monofilament" refers to an elongated metal part with circular cross-section, which is not twisted with other filaments, but which may be twisted around its own axis.

In a preferable embodiment of the invention, the steel monofilament has been plastically twisted around its own axis. Because of the twisting the steel monofilament obtains a surface twist angle different from zero. Preferably the surface twist angle of the straight steel monofilament ranges between 0.5 and 15 degrees, and preferably between 1 and 5 degrees. The twisting of the steel monofilament has the advantage that it takes away variations in the bending stresses. Since the twisting of the steel monofilament is substantially constant over the length of the steel monofilament, the steel monofilament does not show too big variations in stresses and, hence, exhibits an improved constant straightness. Therefore, the median of arc-height of the straight steel monofilament is less than 20 mm, and preferably less than 10 mm. The standard deviation of arc-height of the straight steel monofilament is less than 3 mm, and preferably less than 2 mm.

According to another aspect of present invention, a belt ply of a pneumatic tire is reinforced by plurality of parallel straight steel monofilaments with arc-height less than 30 mm.

The plurality of parallel straight steel monofilaments may be twisted in different directions, and may be embedded in the belt ply alternatively so that an S-twisted monofilament alternates with a Z-twisted filament and vice versa.

The plurality of parallel straight steel monofilament may be twisted in different directions and may form separate groups in a belt ply. One type of groups may contain only S-twisted monofilaments and another type of groups may contain only Z-twisted monofilaments. A group with S-twisted monofilaments may be alternated with a group with Z-twisted monofilaments.

The plurality of parallel straight steel monofilaments may be twisted in different directions and may form separate groups in a belt ply. Each group may contain both S-twisted monofilaments and Z-twisted monofilaments.

According to another aspect of present invention, a pneumatic tire comprises belt ply reinforced by plurality of parallel straight steel monofilament with arc-height less than 30 mm.

According to still another aspect of present invention, a process to manufacture straight steel monofilament is to plastically deform the steel monofilament by twisting along the axis of the steel monofilament. The ratio R between the twist pitch and the diameter of the steel monofilament may range between 7 and 240, and preferably between 20 and 120.

DETAILED DESCRIPTION OF THE INVENTION

Figure 1:
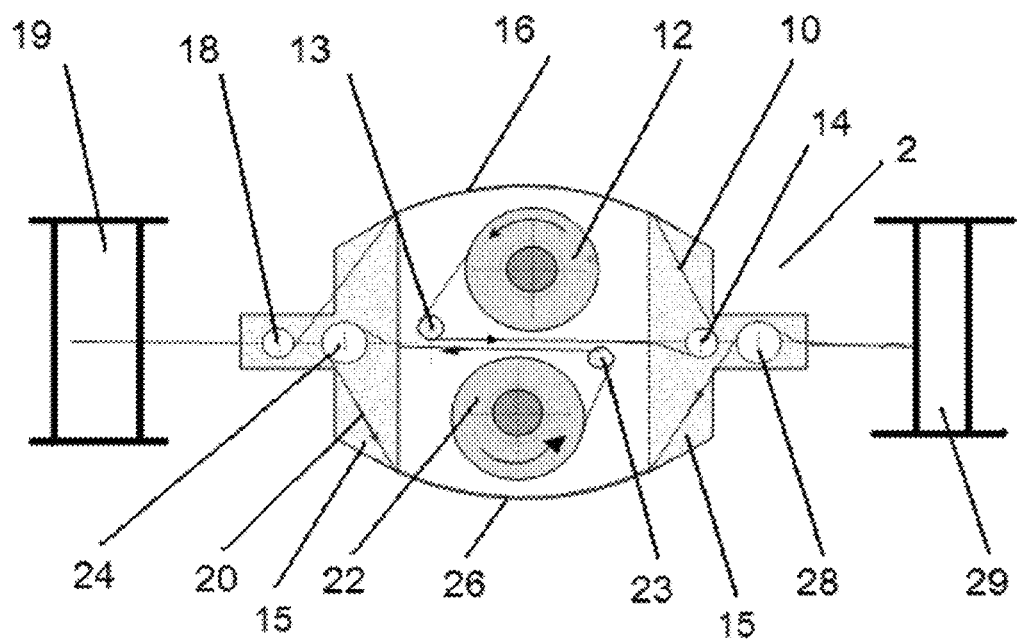
FIG. 1 schematically illustrates a process and device to plastically deform steel monofilament by a twisting along the axis of the steel monofilament.

FIG. 1 schematically illustrates a process and device to plastically deform steel monofilament by a twisting along the axis of the steel monofilament. The device is a double-twisting apparatus 2 for manufacturing a steel cord as disclosed in prior art GB2098251A. The double-twisting apparatus is often referred to as a "buncher". The double-twisting apparatus 2 comprises two torsion discs 15, which are set apart and opposite to each other. On the two torsion discs 15, pulley 14, 18, 24, 28 are installed. Two flyers 16 and 26 are connected to the rim of the two torsion discs 15.

A first filament 10 is drawn from the first spool 12, passes over the pulley 13, 14, passes further over a flyer 16 and over a pulley 18, and finally is wound on spool 19. A second filament 20 is drawn from the second spool 22, passes over the pulleys 23 and 24, passes further over a flyer 26 and over the pulley 28, and finally is wound on spool 29. Both the first spool 12 and the second spool 22 are stationarily mounted inside the rotor of the double twisting apparatus 2. The flyer 16, pulley 14 and pulley 18 constitute the rotating parts for the first filament 10. In operation, when flyer 16 rotates one round, the first filament 10 is given two rounds of twisting in the same rotating direction of the flyer 16, a first one at the position before pulley 14 and a second one at the position after pulley 18. We define the twisting direction of filament by viewing from the rotating side to stationary side at the twisting position. When the rotating part is rotating in clockwise direction, this is the S direction. For example, at the twisting position before pulley 14, the viewing direction is from the rotating side, pulley 14, to the stationary side, pulley 13. If the rotating direction of pulley 14 and flyer 16 is clockwise, this is the S direction. At the twisting position after pulley 18, the viewing direction is from the rotating side, pulley 18, to the stationary side, spool 19. If the rotating direction of pulley 18 and flyer 16 is clockwise, we call it in S direction. Similarly, the flyer 26, pulley 24 and pulley 28 constitute the rotating parts for the second filament 20. Since the viewing direction for filament 20 is different from that of filament 10, filament 10 and filament 20 are twisted in opposite direction. Therefore, the filament 10 on spool 19 is plastically twisted in the opposite direction to the filament 20 on spool 29.

Figure 1A:
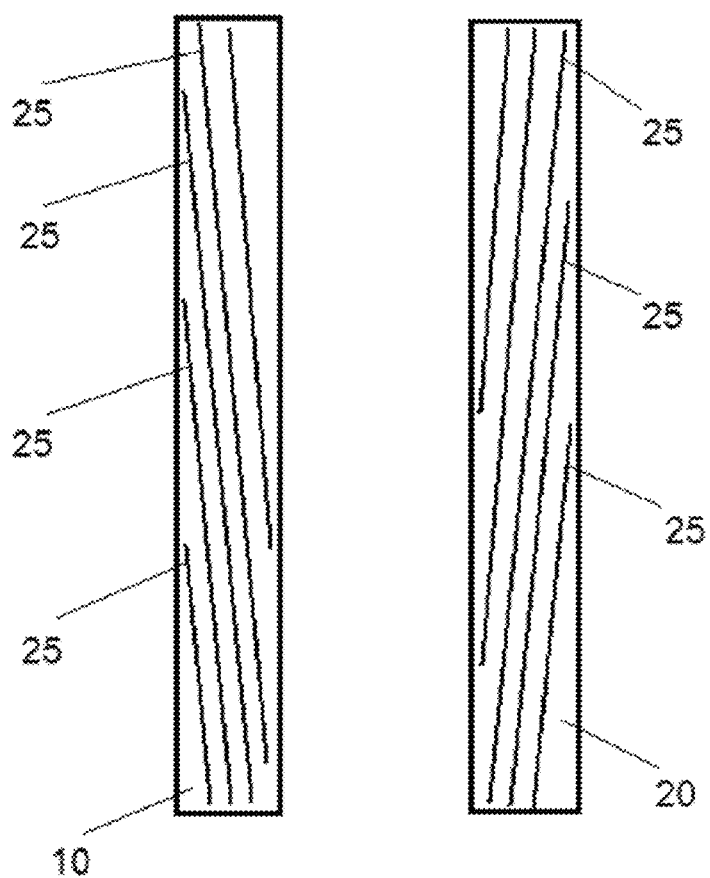
FIG. 1A schematically illustrates the twist direction of steel monofilament.

FIG. 1A schematically illustrates the twisting direction of steel monofilament. When the brass coating on the surface of the steel monofilament is chemically removed, drawing lines, which are in the form of thin grooves on the surface of the steel monofilament, disclose the twist direction of the steel monofilament. In the magnified view, segment of filament 10 is put in the perpendicular direction to the eyes on a plane, while the drawing lines 25 on the surface of filament 10 extend from the top left to the low right. We call filament 10 in S direction. Comparatively, the drawing lines 25 on the surface of filament 20 extend from the top right to the low left. We call filament 20 in Z direction.

The process illustrated in FIG. 1 has a double advantage: first of all with each rotation of the flyers, two rotations or twists are given to the filaments. Secondly two steel filaments are twisted separately and simultaneously. In comparison with a single-twisting apparatus, with one supply spool and one spool for winding-up, there is a quadruple output.

The result of the process of FIG. 1 is a first form of packing a straight steel monofilament according to the invention: each spool contains a single twisted straight steel monofilament.

Figure 1B:
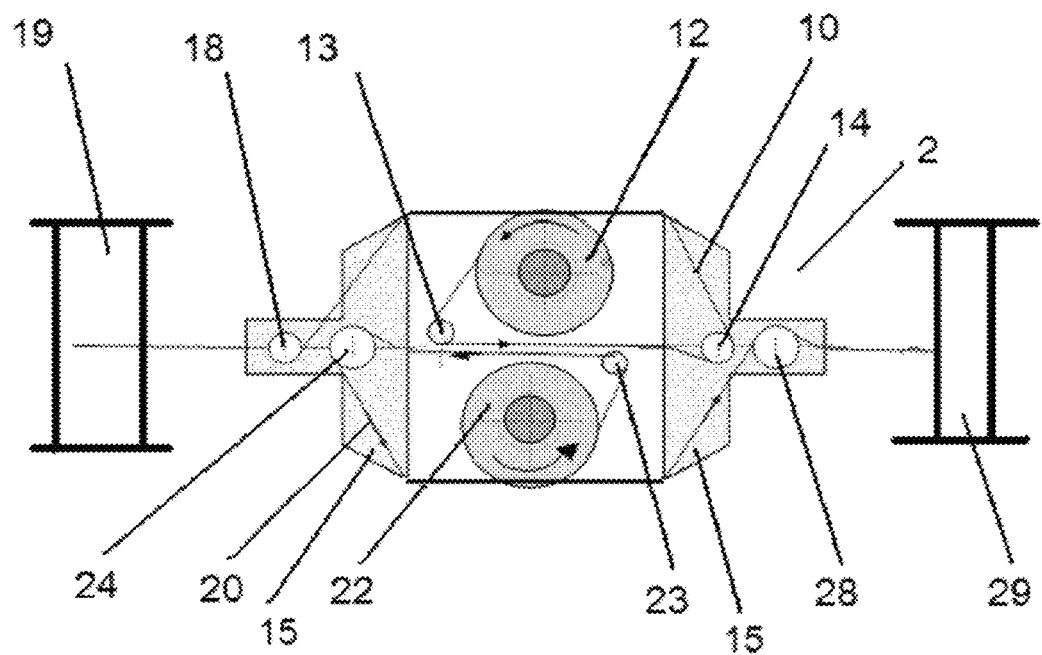
FIG. 1B schematically illustrates a process and device to plastically deform steel monofilament by a twisting along the axis of the steel monofilament.

FIG. 1B schematically illustrates a process and device to plastically deform steel monofilaments by a twisting along the axis of the steel monofilament. The double-twisting apparatus 2 is almost the same as illustrated in FIG. 1, while the difference lies in that the flyers 16 and 26, which are connected the rim of the two torsion discs 15, are removed. In this case, the first filament 10 is drawn from the first spool 12, passes over the pulley 13, 14, the rim of torsion disc 15 on one side, the rim of torsion disc 15 on the other side, the pulley 18, and finally is wound on spool 19. The second filament 20 is drawn from the second spool 22, passes over the pulleys 23 and 24, the rim of torsion disc 15 on one side, the rim of torsion disc 15 on the other side, the pulley 28, and finally is wound on spool 29. Since filament 10 and 20 go through the similar routes as illustrated in FIG. 1, the filament 10 on spool 19 is plastically twisted in the opposite direction to the filament 20 on spool 29.

Figure 1C:
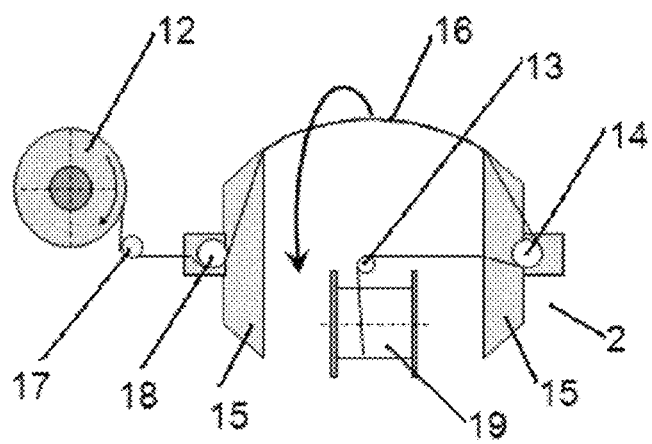
FIG. 1C schematically illustrates a process and device to plastically deform steel monofilament by a twisting along the axis of the steel monofilament.

FIG. 1C schematically illustrates a process and device to plastically deform steel monofilament by a twisting along the axis of the steel monofilament. The double-twisting apparatus 2 is similar to the one illustrated in FIG. 1, while the differences lies in that the monofilament 10 is supplied from outside of the apparatus 2 and the finished monofilament 10 is wound on spool 19, driven by a pick-up system (not shown), inside the apparatus 2. Because of the limited space inside the apparatus 2, there may be only one set of pick-up system as illustrated in FIG. 1C. In this case, the first filament 10 is drawn from the first spool 12, passes over the pulley 17, 18, passes further over a flyer 16 and over the pulley 14, 13, and finally is wound on spool 19.

Figure 2:
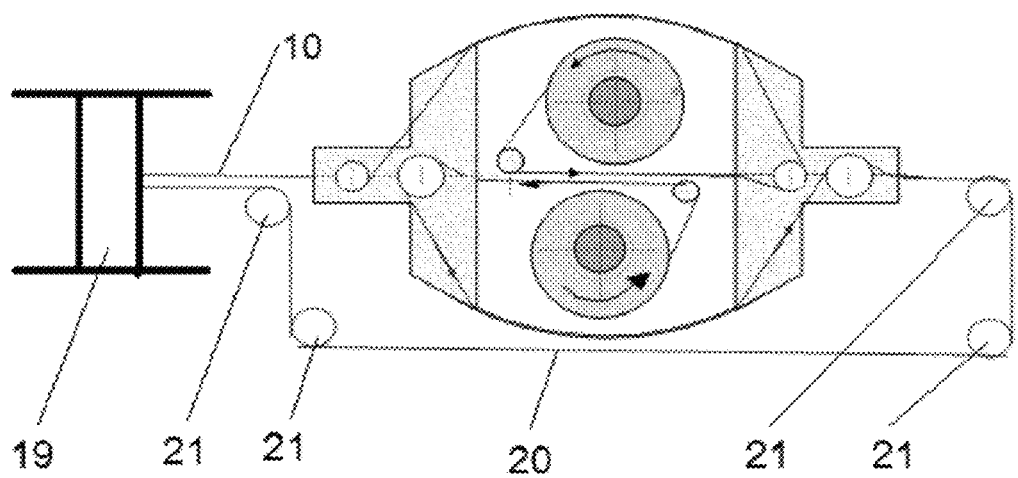
FIG. 2 schematically illustrates a process and device to plastically deform two steel monofilaments by a twisting along their axes of the steel monofilament, and to wound the two filaments twisted in different directions on one spool.

FIG. 2 schematically illustrates a process and device to plastically deform steel monofilaments by a twisting along the axes of the steel monofilaments, and to wound the two filaments twisted in different directions on one spool. The filaments 10 and 20, and the double-twisting apparatus 2 are the same as illustrated in FIG. 1. The difference lies in that the second filament 20 is guided by a series of pulleys 21 to be wound on the same spool 19 as the first filament 10. Since the twisting direction of filament 10 is different from that of filament 20, spool 19 is filled with two filaments with different twisting directions wound closely together according to prior art WO03/076321A1.

The result of the process of FIG. 2 is a second form of packing straight steel monofilaments according to the invention: each spool contains two twisted straight steel monofilaments, one twisted in S, the other twisted in Z.

Figure 3:
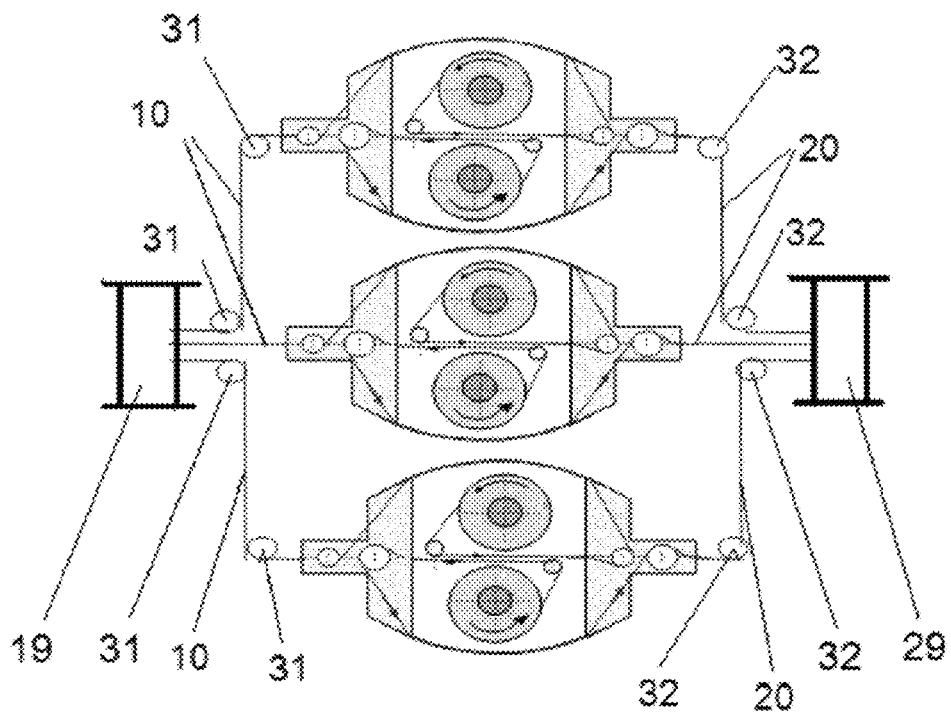
FIG. 3 schematically illustrates a process and device to plastically deform steel monofilament by a twisting along the axis of steel monofilament, and to wound multiple filaments twisted in same directions on one spool.

FIG. 3 schematically illustrates a process and device to plastically deform steel monofilament by a twisting along the axis of steel monofilament, and to wound multiple filaments twisted in same directions on one spool. The filaments 10 and 20, and the double twisting apparatus 2 are the same as the illustrated in FIG. 1. The difference lies in that multiple double-twisting apparatus 2 are parallel arranged and are rotating in the same direction. All the filaments 10 twisted in one twisting direction are guided by a series of pulleys 31 to be wound on spool 19, while all filaments 20 in twisted in opposite direction are guided over pulleys 32 and wound on spool 29. The filaments can be wound closely together on the spool according to prior art WO03/076342A1. Since multiple steel monofilaments with same twist direction can be wound on one spool, the filling rate of the spool is increased by times, and it also helps to save the space of calendaring operation in belt ply formation process.

The process illustrated in FIG. 3 leads to a third form of package of straight monofilaments according to the invention: Each spool contains a plurality of straight monofilaments twisted in the same direction: all S or all Z.

A further improvement on the process and apparatus (not shown) is to combine the parallel double-twisting apparatus 2 in FIG. 3 and the series of pulley 21 in FIG. 2, and to fill spool 19 with multiple steel monofilaments with different twist directions alternatively disposed next to each other.

Figure 4:
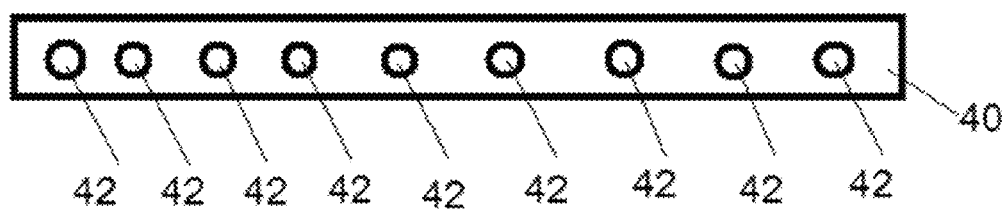
FIG. 4 schematically illustrates a cross-sectional view of a belt ply reinforced by plurality of parallel straight steel monofilaments.

FIG. 4 schematically illustrates a cross sectional view of a belt ply reinforced by plurality of parallel straight steel monofilaments. The belt ply 40 is reinforced by plurality of parallel straight steel monofilaments 42. Since in this embodiment no distinction is made as to the twist direction of the monofilaments, spools from processes illustrated in FIGS. 1, 2, and 3 are all suitable this application.

Figure 5:
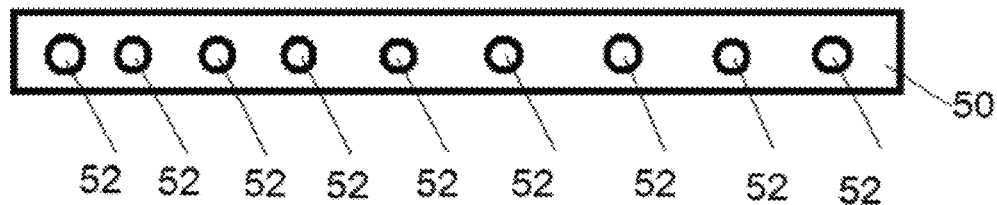
FIG. 5 schematically illustrates a cross-sectional view of a belt ply reinforced by plurality of parallel straight steel monofilaments, wherein the steel monofilaments are twisted in same direction.

FIG. 5 schematically illustrates a cross-sectional view of a belt ply reinforced by plurality of parallel straight steel monofilaments, wherein the steel monofilaments are twisted in same direction. The belt ply 50 is reinforced by plurality of parallel straight steel monofilaments 52, and the steel monofilaments 52 are twisted in same direction. The steel monofilaments 52 can be supplied by the spools in FIG. 1 wherein the spools contains steel monofilaments 52 with same twisting direction. To save calendering space, the steel monofilaments 52 with same twist direction can be supplied by the spools in FIG. 3, wherein the spool contains multiple steel monofilaments 52 with the same twist direction.

Figure 5A:
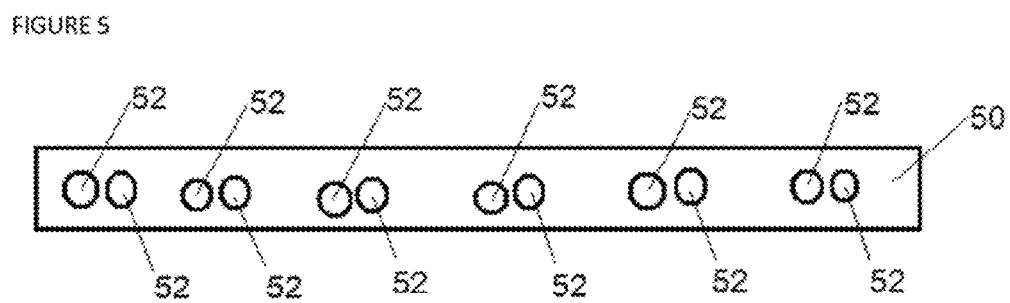
FIG. 5A schematically illustrates a cross-sectional view of a belt ply reinforced by plurality of parallel straight steel monofilaments, wherein the steel monofilaments are twisted in same direction and are grouped to be embedded in the belt ply.

FIG. 5A schematically illustrates a cross-sectional view of a belt ply reinforced by plurality of parallel straight steel monofilaments, wherein the steel monofilaments are twisted in same direction and are grouped to be embedded in the belt ply. The belt ply 50 is reinforced by plurality of parallel straight steel monofilaments 52, and the steel monofilaments 52 are twisted in same direction. Every two steel monofilaments 52 are further grouped together as a group to be embedded in the belt ply 50. The steel monofilaments 52 with same twist direction can be supplied by the spools in FIG. 3, wherein the spool contains multiple steel monofilaments 52 with same twist direction.

Figure 6:
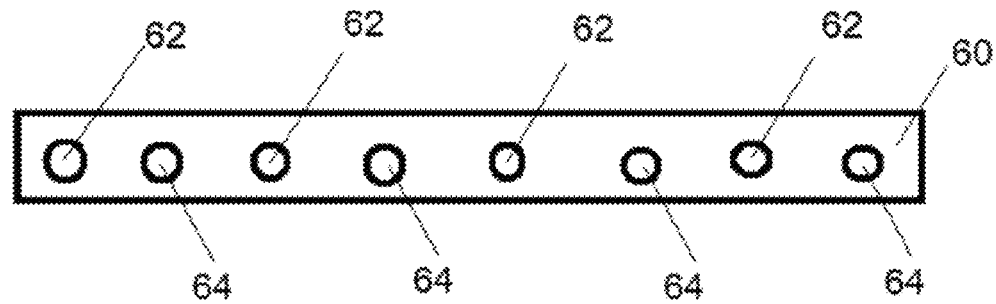
FIG. 6 schematically illustrates a cross-sectional view of a belt ply reinforced by a plurality of parallel straight steel monofilaments, wherein the steel monofilaments are twisted in different direction and are embedded in the belt ply alternatively.

FIG. 6 schematically illustrates a cross-sectional view of a belt ply reinforced by plurality of parallel straight steel monofilaments, wherein the steel monofilaments are twisted in different direction and are embedded in the belt ply alternatively. The belt ply 60 is reinforced by plurality of parallel straight steel monofilaments 62 and 64. The steel monofilaments 62 and 64 are plastically twisted in different direction and are embedded in the belt ply 60 alternatively. For example, an S-twisted steel monofilament 62 alternates with a Z-twisted monofilament 64 and vice versa.

Figure 7:
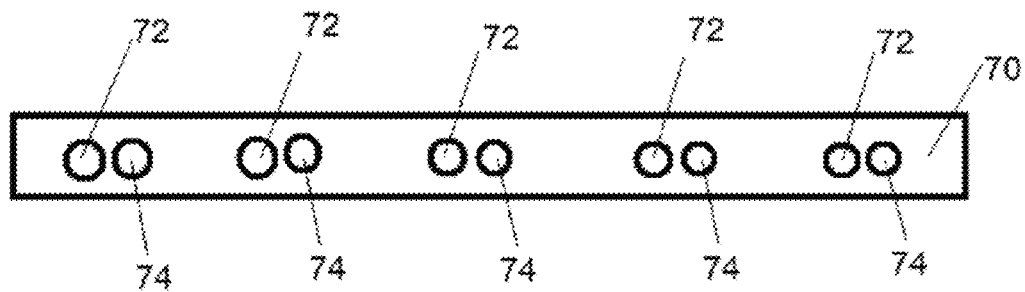
FIG. 7 and FIG. 7A schematically illustrate a cross-sectional view of a belt ply reinforced by plurality of parallel straight steel monofilaments, wherein the steel monofilaments are twisted in different direction and are alternatively placed in groups to be embedded in the belt ply.
Figure 7A:
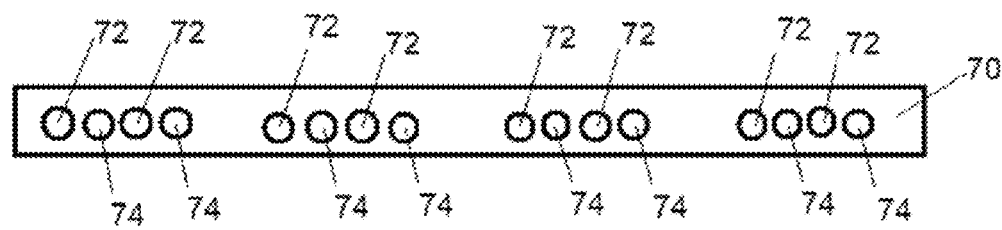

FIG. 7 and FIG. 7A schematically illustrate a cross-sectional view of a belt ply reinforced by plurality of parallel straight steel monofilaments, wherein the steel monofilaments are twisted in different direction and are grouped to be embedded in the belt ply. The belt ply 70 is reinforced by plurality of parallel straight steel monofilaments 72 and 74. The steel monofilaments 72 and 74 are twisted in different direction and are grouped to be embedded in the belt ply 70. For example, an S-twisted steel monofilament 72 alternates with a Z-twisted monofilament 74 and vice versa.

Figure 8:
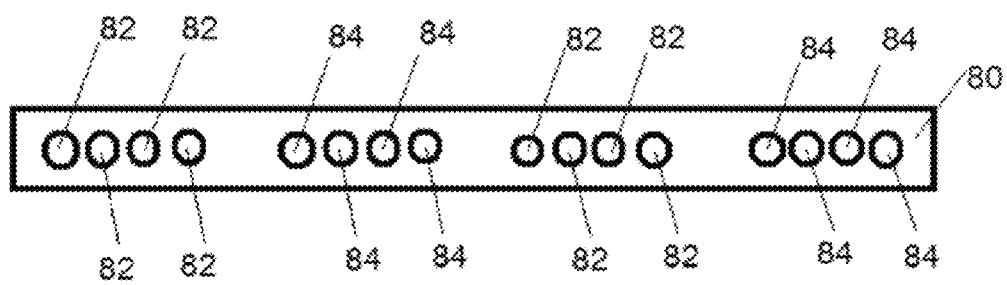
FIG. 8 schematically illustrates a cross-sectional view of the belt ply reinforced by plurality of parallel straight steel monofilaments, wherein the steel monofilaments are grouped and twisted in different direction, and groups of monofilaments with different direction are embedded in the belt ply alternatively.

FIG. 8 schematically illustrates a cross-sectional view of the belt ply reinforced by plurality of parallel straight steel monofilaments, wherein the steel monofilaments are grouped and twisted in different direction, and groups of monofilaments with different direction are embedded in the belt ply alternatively. The belt ply 80 is reinforced by plurality of parallel straight steel monofilaments 82 and 84. The steel monofilaments 82 and 84 are twisted in different direction, and group of steel monofilaments 82 and group of steel monofilaments 84 are alternatively embedded in the belt ply 80. For example, a group of S-twisted steel monofilaments 82 alternates with a group of Z-twisted steel monofilaments 84 and vice versa.

In general, the steel monofilament from present invention has a good quality on straightness: there is a reduced arc height, and the level of straightness is more consistent and constant over the length of the steel monofilament and over various different steel monofilaments. This is so because the plastic twist deformation eliminates the differences on surface stress so that the arc-height of the steel monofilaments may be kept in a range suitable for belt ply reinforcement, i.e. in a range below 30 mm. Therefore, the difference of twist direction of the steel monofilaments should no lead to quality problems of calendaring in belt ply making process. But to play safe, it is recommended to use the above mentioned approaches to arrange the steel monofilaments in the belt ply for two reasons. Firstly, steel monofilaments with different twisting direction may further neutralize the effects from surface stress differences on steel monofilaments to the belt ply to avoid process or quality problems. Secondly, multiple steel monofilaments can be grouped and wound on one spool as disclosed in FIGS. 2 and 3, to save space and set-up time for calendaring operation, because less spools are used. Meanwhile, more steel monofilaments can be embedded in belt ply with same width to increase the strength of the belt ply, because the gap between monofilaments in the same group is usually smaller than that of evenly distributed ones as illustrated in FIGS. 4, 5, and 6.

Figure 9:
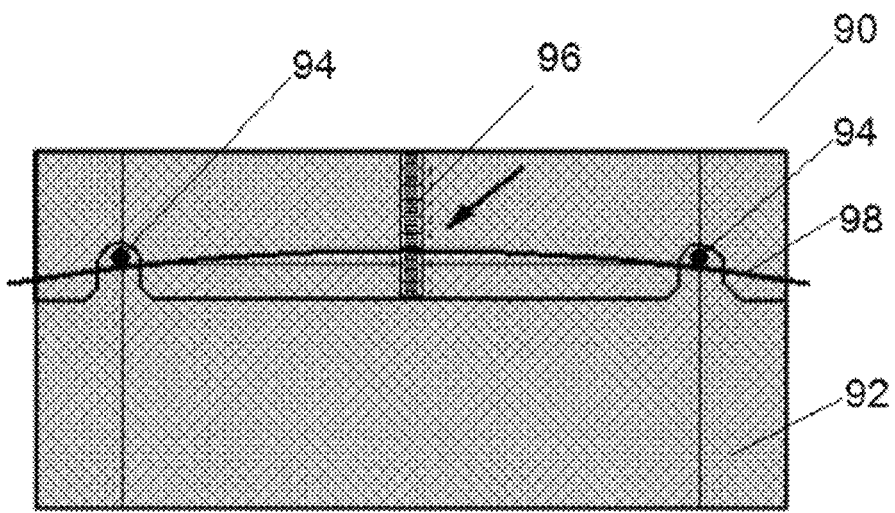
FIG. 9 schematically illustrates the method and test device to measure the arc-height of steel monofilament.

Arc-height is a parameter to verify the deviation from straightness of a steel monofilament by measuring the "arc height" over a defined "chord length". FIG. 9 schematically illustrates a method and a device to measure the arc-height of a steel monofilament. The test device 90 comprises a board 92, on which two pins 94 are set 300 mm apart measuring from the center of the pin, and one scale 96 in the middle of the two pins 94 with the scale "0" matches the tangent line of the two pins 94. The test method includes the steps of, firstly cut a specimen 98 of steel monofilament in between 40 and 45 cm, secondly put the specimen 98 on the board 92 and push the specimen 98 toward the two pins 94, finally read the figure on the scale 96 at the highest point of the arc when the specimen 98 touches the two pins 94. The figure on the scale 96 at the highest point of the arc of the specimen 98 is the arc-height of the steel monofilament. In some cases, because of the big difference of surface stress on the steel monofilament, the specimen may curl into a circle with diameter less than 300 mm. In this kind of cases, the arc-height of the steel monofilament is more than 150 mm. Another situation to be noted is that when unwinding filament over the flange of a spool, a torsion or twist is created on the filament if the spool is fixed. There will be one twist per 360 degree unwinding of the filament. As a consequence, for a full spool there are less twists than for the almost empty spool because the length of a filament needed to make a 360 degree unwinding is greater for a full spool than for an empty spool. *Statistical Process Control (SPC) reference manual* by Chrysler Corporation, Ford Motor Company, and General Motors Corporation, provides the guideline on how to sampling and calculate the median and standard deviation of arc-height.

Figure 10:
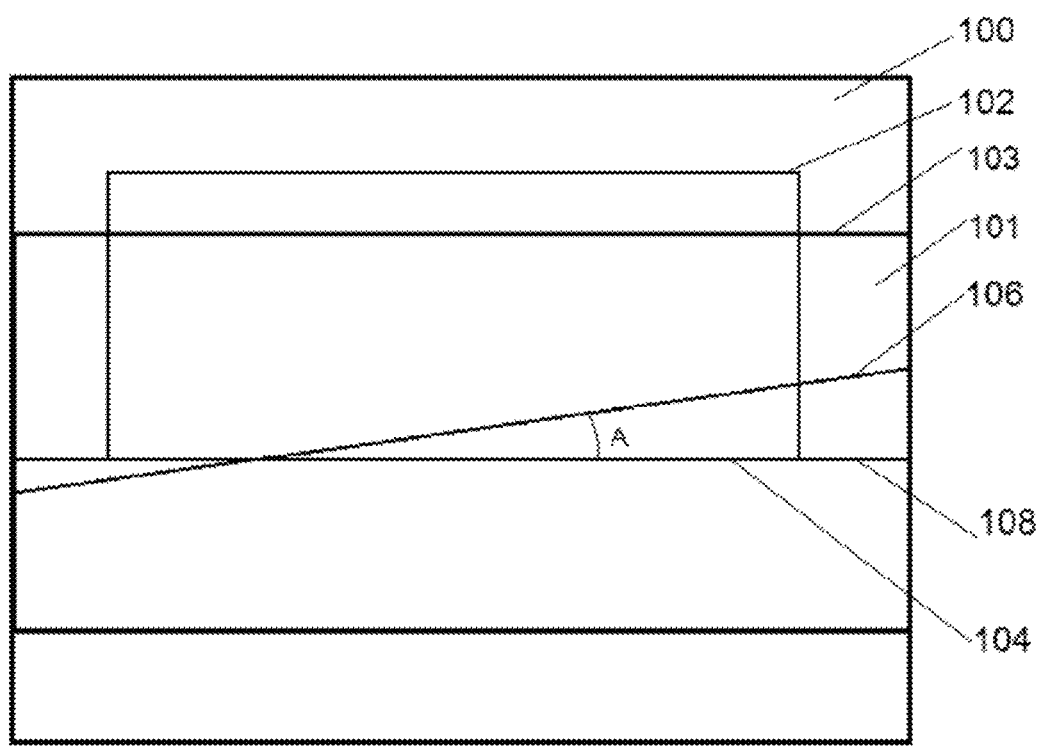
FIG. 10 schematically illustrates the method to measure the surface twist angle of steel monofilament.

The surface twist angle is the angle formed by the drawing lines on the steel wire with respect to the axis of the steel wire. The drawing lines of the steel wire are imperfections due to the drawing process and are e.g. in the form of thin grooves on the surface of the steel wire after drawing. The surface twist angle parameter is to characterize the plastic twist deformation of the steel monofilament. FIG. 10 schematically illustrates a method to measure the surface twist angle of a steel monofilament. Firstly, the brass coating of the steel monofilament should be removed to uncover the scratches from wet drawing process on the surface of the steel monofilament. The preparation of 1 liter stripping solution to remove brass coating comprises the steps, weigh 16 gram $(NH_4)_2S_2O_8$ into a beaker of 600 ml and dissolve in 400 ml demineralized water, transfer quantitatively into a 1 liter volumetric flask, add 120 ml $NH_3$ d=0.91, fill up to the mark with demineralized water, shake well. The process to prepare the test specimen includes the steps, cut a specimen of the steel monofilament in length of around 50 mm, dis-solve the specimen in the stripping solution for 5 minutes to remove the brass coating, dry the specimen for next step. Secondly, a photo of the specimen is taken on a Scanning-Electro-Microscope with 500× magnification ratio. In the photo, with the size about 500 μm×400 μm, the specimen should be located in the center, and the edge of the specimen should parallel to the edge of the photo. Thirdly, the surface twist angle is measured on the photo with a image process software, analySIS version 5.1 copyright 1986-2009 by Olympus Soft Imaging Solutions GmbH. FIG. 10 schematically illustrates the measurement of the surface twist angle. The process comprises following steps, firstly draw a rectangle 102 using the functional button "Rectangle" on the photo 100 and make sure the line 104 of about 400 μm in length is located in the center area of the specimen 101, i.e. +/−20% of the diameter of the specimen 101 from the center line of the specimen 101. Since line 104 is always parallel to the edge of the photo 100, and the edge 103 of the specimen is parallel to the edge of the photo, line 104 is parallel to the edge 103 of the specimen and the center line (not shown) of the specimen 101. Secondly measure the surface twist angle using the functional button "4 points Angle" to draw a straight line 106 fitting one of the drawing lines in the center area of the specimen 101, to draw a straight line 108 fitting line 104, and the software will give the rating of the sharp angle A between line 106 and line 108, which is the surface twist angle of the steel monofilament.

A typical steel composition of the steel monofilament for rubber reinforcement has a minimum carbon content of 0.65%, a manganese content ranging from 0.40% to 0.70%, a silicon content ranging from 0.15% to 0.30%, a maximum sulphur content of 0.03%, a maximum phosphorus content of 0.30%, all percentages being percentages by weight. Elements such as copper, nickel and/or chromium may be present in traces or in amounts varying up to 0.4 weight %. A typical steel composition for high-tensile steel monofilament has a minimum carbon content of around 0.80 weight %, e.g. 0.78-0.82 weight %.

The steel monofilament is manufactured according to following steps from a wire rod with above composition. The wire rod is firstly cleaned by mechanical descaling and/or by chemical pickling in a $H_2SO_4$ or HCl solution in order to remove the oxides present on the surface. The wire rod is then rinsed in water and is dried. The dried wire rod is then subjected to a first series of dry drawing operations in order to reduce the original diameter, for example, about 5.5 mm to 8 mm, until a first intermediate diameter.

At this first intermediate diameter $d_1$, e.g. at about 3.0 to 3.5 mm, the dry drawn steel monofilament is subjected to a first intermediate heat treatment, called patenting. Patenting means first austenitizing until a temperature of about 1000° C. followed by a transformation phase from austenite to pearlite at a temperature of about 600-650° C. The steel monofilament is then ready for further mechanical deformation.

Thereafter the steel monofilament is further dry drawn from the first intermediate diameter $d_1$ until a second intermediate diameter $d_2$ in a second number of diameter reduction steps. The second diameter $d_2$ typically ranges from 1.0 mm to 2.5 mm.

At this second intermediate diameter $d_2$, the steel monofilament is subjected to a second patenting treatment, i.e. austenitizing again at a temperature of about 1000° C. and thereafter quenching at a temperature of 600 to 650° C. to allow for transformation from austenite to pearlite. If the total reduction in the first and 2nd dry drawing step is not too big a direct drawing operation can be done from monofilament rod till diameter $d_2$.

After this second patenting treatment the steel monofilament is usually provided with a brass coating: copper is plated on the steel monofilament and zinc is plated on the copper. A thermo-diffusion treatment is applied to form the brass coating.

The brass-coated steel monofilament is then subjected to a final series of cross-section reductions by means of wet drawing machines. The final product is a steel monofilament with carbon content above 0.60 per cent by weight, with a tensile strength typically above 2000 MPa and adapted for the reinforcement of elastomer products.

Steel monofilaments adapted for rubber reinforcement typically have a final diameter ranging from 0.05 mm to 0.60 mm, e.g. from 0.10 mm to 0.40 mm. Examples of monofilament diameters are 0.10 mm, 0.12 mm, 0.15 mm, 0.175 mm, 0.18 mm, 0.20 mm, 0.22 mm, 0.245 mm, 0.28 mm, 0.30 mm, 0.32 mm, 0.35 mm, 0.38 mm, 0.40 mm.

The steel monofilament is further processed according to the process and on the device illustrated by FIG. 1, 2, or 3, to plastically deform the steel monofilament by a twisting along the axis of the steel monofilament.

A comparison test on arc-height and surface twist angle on steel monofilament from different processes discloses following data.

| Processes | Arc-height | Surface twist angle |
| --- | --- | --- |
| WWD | >50 mm | n/a |
| WWD + roller straightener | 30-40 mm | n/a |
| WWD + plastic twist deformation (present invention) | <30 mm | 1-5 degree |

"WWD" means the steel monofilament is finished from a wet drawing process without any straightening process, wherein the arc-height of the steel monofilament is always above 50 mm because of the un-even surface stress of the monofilament from wet-wire-drawing process, and the surface twist angle is not applicable because the steel monofilament does not have any plastic twist deformation. "WWD+roller straightener" means the steel monofilament is firstly finished from a wet drawing process and secondly straightened by a roller straightener, wherein the arc-height of the steel monofilament is between 30 mm and 40 mm because the consecutive bending between rollers release some surface stress of the monofilament, and the surface twist angle is not applicable because the steel monofilament does not have any plastic twist deformation. "WWD+plastic twist deformation" means the steel monofilament is firstly finished from a wet drawing process and secondly straightened by a plastic twist deformation as disclosed by present invention, wherein the arc-height of the steel monofilament is less than 30 mm because the plastic twist deformation controls the difference of surface stress of the steel monofilament, and the surface twist angle is between 1 to 5 degree. Since the arc-height of the steel monofilament according to present invention is less than 30 mm, which is suitable for belt ply reinforcement of a pneumatic tire.

Four sets of test on arc-height of straight steel monofilaments from different processes also confirm that present invention is stable on controlling the arc-height of straight steel monofilament.

| processes | Arc-height (in mm) | | | |
| --- | --- | --- | --- | --- |
| | Maximum | Minimum | Median | Standard deviation |
| WWD + roller straightener 1 | 38 | 12 | 25 | 7 |
| WWD + roller straightener 2 | 34 | 6 | 20 | 7 |
| WWD + plastic twist deformation (present invention) 1 | 21 | 13 | 17 | 1.5 |
| WWD + plastic twist deformation (present invention) 2 | 13 | 8 | 10 | 1.4 |

In the above test, although the arc-height of some portions of steel monofilament from "WWD+roller straightener" process may less than 30 mm, there are always portions on the same steel monofilament where the arc-height is more than 30 mm, because roller straightener can not release all the surface stress on the filament and the standard deviation of the arc-height is as big as 7 mm. On the contrary, present invention "WWD+plastic twist deformation" provides constant twist over the length of the steel monofilament, which substantially reduce the variations in stresses and, hence, exhibits an improved constant straightness with standard deviation of the arc-height as small as 1.5 mm.

The straightness of a non-twisted steel monofilament depends on the distribution of surface stress on the steel monofilament. Usually the monofilament from wet drawing process has a big arc-height because the surface stress on the steel monofilament is un-evenly distributed, i.e. the surface stress on one side is higher than that on the opposite side and the steel monofilament curls in an arc form to reflect the difference of surface stress. The roller straightener can partially eliminate the difference of surface stress by consecutive bending. Therefore, the arc-height of steel monofilament from "WWD+roller straightener" is lower than that from "WWD". But roller straightener has its limits. Firstly, the roller straightener has limit to provide a perfectly straight monofilament because the roller straightener can not release all the surface stress on the filament. Secondly, the fine tune of the roller straightener is time-consuming and costly because of the variation of bending stress in the filament. Thirdly, the result of the straightening process can not be maintained because of the variation of bending stress in the filament in mass production. For example, some portions of the monofilament are straight while other portions are out of range. Present invention uses plastic twist deformation to fundamentally change the surface stress, to control or even eliminate difference of surface stress on the steel monofilament to an acceptable range, and finally provides a straight steel monofilament with arc-height lower than 30 mm. To maintain a good result of straightness, without undermining the other property of the steel monofilament for tire reinforcement, for example, the tensile strength and fatigue, there are limits on the plastic twist deformation. The surface twist angle should be more than 0.5 degree, and preferably more than 1 degree, to make sure there are enough plastic twist deformation on the steel monofilament to control the difference of surface stress and to provide a straight steel monofilament with arc-height lower than 30 mm. On the other hand, the surface twist angle should be less than 15 degree, and preferably less than 5 degree, to make sure the plastic twist deformation does not eventually undermines the other property of the steel monofilament for tire reinforcement, for example, the tensile strength and fatigue. Consequently, the ratio R between the twist pitch and the diameter of the steel monofilament is between 7 and 240, and preferably between 20 and 120. In one embodiment, a steel monofilament with a diameter of 0.30 mm, is plastically twisted on a double-twisting apparatus 2 as illustrated in FIG. 1, with a twisting pitch 20 mm. When the rotor of apparatus 2 rotates at a speed of 6000 turns per minute, the process speed of the steel monofilament is 240 meters per minute. Compared with prior art, present invention provides a simple solution with existing apparatus to manufacture straight steel monofilament suitable for tire reinforcement with high speed for mass production.

The invention claimed is:

1. A method of manufacturing a steel monofilament for the reinforcement of belt ply of a pneumatic tire, comprising the following steps:

preparing at least one first spool of the steel filament with a diameter ranging from 0.05 mm to 0.60 mm for paying-off, at least one second spool for taking-up, at least one double twisting apparatus for twisting;

the steel filament being paid-off from the first spool, and then being guided into the double-twisting apparatus, and then being wound on the second spool, at the double twisting apparatus the steel filament being given twice twists in the same direction, thereby the steel filament being plastically twisted along its axis in S or Z twist direction to form a steel monofilament, the steel monofilament having an arc height less than 30 mm, wherein the steel monofilament has a carbon content of at least 0.65%.

2. The method of manufacturing a steel monofilament as claimed in claim 1, wherein the number of the first spool is more than the number of the second spool, and one second spool is wound with at least two seperate steel monofilaments with the same or different twist direction.

3. The method of manufacturing a steel monofilament as claimed in claim 1, wherein the first spool is laid inside or outside the double twisting apparatus, and the second spool is laid correspondingly outside or inside the double twising apparatus.

4. The method of manufacturing a steel monofilament as claimed in claim 2, wherein the first spool is laid inside or outside the double twisting apparatus, and the second spool is laid correspondingly outside or inside the double twising apparatus.

5. The method of manufacturing a steel monofilament as claimed in claim 1, wherein the steel monofilament has an arc height being less than 20 mm.

6. The method of manufacturing a steel monofilament as claimed in claim 5, wherein the steel monofilament has an arc height being less than 10 mm.

7. The method of manufacturing a steel monofilament as claimed in claim 1, wherein the steel monofilament has a surface twist angle being between 0.5 and 15 degree.

8. The method of manufacturing a steel monofilament as claimed in claim 7, wherein the steel monofilament has a surface twist angle being between 1 and 5 degree.

9. The method of manufacturing a steel monofilament as claimed in claim 1, further comprising the step of reinforcing a belt ply in a pneumatic tire using a plurality of the steel monofilaments in parallel.

10. A method of manufacturing a steel monofilament for the reinforcement of belt ply of a pneumatic tire, comprising the following steps:

preparing at least one first spool of the steel filament with a diameter ranging from 0.05 mm to 0.60 mm for paying-off, at least one second spool for taking-up, at least one double twisting apparatus for twisting;

reducing the arc height of the steel monofilament to less than 30 mm by paying-off the steel filament from the first spool, and then guiding the steel filament into the double-twisting apparatus, and then winding the steel filament on the second spool, at the double twisting apparatus the steel filament being given twice twists in only the same direction, thereby the steel filament being plastically twisted along its axis in S or Z twist direction to form a steel monofilament, wherein the steel filament has a carbon content of at least 0.65%.

* * * * *